US009109812B2

(12) United States Patent
Colson

(10) Patent No.: US 9,109,812 B2

(45) Date of Patent: Aug. 18, 2015

(54) SOLAR HEATING CELLS AND SUPPORT APPARATUS THEREFOR

(75) Inventor: Wendell B. Colson, Weston, MA (US)

(73) Assignee: HUNTER DOUGLAS INC., Pearl River, NY (US)

( * ) Notice: Subject to any disclaimer, the term of this patent is extended or adjusted under 35 U.S.C. 154(b) by 1005 days.

(21) Appl. No.: 13/060,683

(22) PCT Filed: Aug. 24, 2009

(86) PCT No.: PCT/US2009/004839

§ 371 (c)(1),
(2), (4) Date: Feb. 24, 2011

(87) PCT Pub. No.: WO2010/024885

PCT Pub. Date: Mar. 4, 2010

(65) Prior Publication Data

US 2011/0146664 A1 Jun. 23, 2011

Related U.S. Application Data

(60) Provisional application No. 61/190,151, filed on Aug. 25, 2008.

(51) Int. Cl.
*F24J 2/48* (2006.01)
*F24J 2/04* (2006.01)
(Continued)

(52) U.S. Cl.
CPC ................ *F24J 2/0444* (2013.01); *F24J 2/345* (2013.01); *F24J 2/465* (2013.01); *F24J 2/4643* (2013.01); *F24J 2/5205* (2013.01); *F24J 2/526* (2013.01); *F24J 2002/502* (2013.01);
(Continued)

(58) Field of Classification Search
CPC ........................................ F24J 2/48; F24J 2/51
USPC ................ 126/619, 709, 679; 428/34; 52/105
See application file for complete search history.

(56) References Cited

U.S. PATENT DOCUMENTS 1,962,868 A 6/1934 Gregg
2,012,887 A 8/1935 Major
(Continued)

FOREIGN PATENT DOCUMENTS

CN 2634076 Y 8/2004
CN 1918356 A 2/2007
(Continued)

OTHER PUBLICATIONS

Written Opinion of the International Search Authority, issued in related international application No. PCT/US2009/064682, mailed Oct. 23, 2009.

(Continued)

*Primary Examiner* — Gregory Huson
*Assistant Examiner* — Nikhil Mashruwala
(74) *Attorney, Agent, or Firm* — Day Pitney LLP

(57) ABSTRACT

A solar heating cell includes a core substantially in the form of a parallelepiped having two open sides. O-rings are disposed within channels running about the edges of the two open sides and glass plates are clamped with compression clips to the two open sides forming air and watertight seals with the O-rings. The solar heating cell is filled with a liquid mixture, primarily water. A solar heating panel is made by mounting a number of the solar heating cells on a support apparatus in an opening through an external wall of a building.

55 Claims, 12 Drawing Sheets

(51) Int. Cl.
*F24J 2/34* (2006.01)
*F24J 2/46* (2006.01)
*F24J 2/52* (2006.01)
*F24J 2/50* (2006.01)

(52) U.S. Cl.
CPC ................ *Y02B 10/20* (2013.01); *Y02E 10/44* (2013.01); *Y02E 10/47* (2013.01)

(56) References Cited

U.S. PATENT DOCUMENTS

| | | | |
|---|---|---|---|
| 2,024,090 A | 12/1935 | Cadmus | |
| 2,231,778 A | 2/1941 | Swanson | |
| 2,267,869 A | 12/1941 | Loehr | |
| 3,990,201 A | 11/1976 | Falbel | |
| 4,066,062 A | 1/1978 | Houston | |
| 4,069,809 A | 1/1978 | Strand | |
| 4,215,675 A * | 8/1980 | Embree | 126/661 |
| 4,240,235 A * | 12/1980 | Nawa | 52/204.591 |
| 4,244,354 A | 1/1981 | Williams | |
| 4,271,826 A | 6/1981 | Duchene | |
| 4,286,576 A | 9/1981 | McClelland | |
| 4,290,416 A | 9/1981 | Maloney | |
| 4,338,996 A | 7/1982 | Frank | |
| 4,359,079 A | 11/1982 | Bledsoe | |
| 4,382,436 A | 5/1983 | Hager | |
| 4,508,099 A | 4/1985 | Clavier | |
| 4,532,917 A | 8/1985 | Taff et al. | |
| 4,535,828 A | 8/1985 | Brockhaus | |
| 4,550,758 A | 11/1985 | Johnson et al. | |
| 4,649,980 A | 3/1987 | Kunz | |
| 4,692,744 A | 9/1987 | Hickman | |
| 4,722,382 A | 2/1988 | Vecchiarelli | |
| 5,129,440 A | 7/1992 | Colson | |
| 5,217,000 A | 6/1993 | Pierce-Bjorklund | |
| 5,325,579 A | 7/1994 | Baier | |
| 5,491,936 A * | 2/1996 | Logan et al. | 52/105 |
| 5,503,210 A | 4/1996 | Colson et al. | |
| 5,547,006 A | 8/1996 | Auger | |
| 5,566,738 A | 10/1996 | Yadidya | |
| 5,638,881 A | 6/1997 | Ruggles et al. | |
| 6,257,302 B1 | 7/2001 | Bednarczyk et al. | |
| 6,374,896 B1 | 4/2002 | Moller | |
| 6,470,950 B2 | 10/2002 | Shimizu | |
| 6,613,404 B2 | 9/2003 | Johnson | |
| 6,688,369 B2 | 2/2004 | Colson et al. | |
| 6,745,811 B1 | 6/2004 | Nien | |
| 6,758,211 B1 | 7/2004 | Schmidt | |
| D496,204 S | 9/2004 | Tuzmen | |
| 6,792,994 B2 | 9/2004 | Lin | |
| 7,058,292 B2 | 6/2006 | Hirano | |
| 7,409,980 B1 | 8/2008 | Heissenberg | |
| 7,588,068 B2 | 9/2009 | Colson et al. | |
| 7,737,356 B2 * | 6/2010 | Goldstein | 136/251 |
| 8,082,916 B2 | 12/2011 | Colson | |
| 8,171,640 B2 | 5/2012 | Colson et al. | |
| 8,430,091 B2 | 4/2013 | Colson | |
| 8,496,768 B2 | 7/2013 | Holt et al. | |
| 8,639,387 B2 | 1/2014 | Byberg et al. | |
| 8,763,673 B2 | 7/2014 | Jelic et al. | |
| 2003/0064176 A1 * | 4/2003 | Johnson | 428/34 |
| 2005/0205217 A1 | 9/2005 | Harper et al. | |
| 2006/0191646 A1 | 8/2006 | Harper et al. | |
| 2006/0207730 A1 | 9/2006 | Berman et al. | |
| 2007/0039611 A1 * | 2/2007 | Benvenuti | 126/652 |
| 2007/0074826 A1 | 4/2007 | Jelic et al. | |
| 2007/0088104 A1 | 4/2007 | Hung et al. | |
| 2008/0011289 A1 * | 1/2008 | Sichanugrist et al. | 126/634 |
| 2008/0303686 A1 | 12/2008 | Mosbrucker | |
| 2010/0212661 A1 * | 8/2010 | Schwarze et al. | 126/705 |
| 2011/0133940 A1 | 6/2011 | Margalit | |
| 2012/0241104 A1 | 9/2012 | Huffer et al. | |
| 2013/0098565 A1 | 4/2013 | Colson et al. | |
| 2013/0105094 A1 | 5/2013 | Colson et al. | |
| 2013/0180676 A1 | 7/2013 | Berman et al. | |
| 2014/0034251 A1 | 2/2014 | Colson et al. | |

FOREIGN PATENT DOCUMENTS

| | | | | |
|---|---|---|---|---|
| CN | 101455856 A | 6/2009 | | |
| DE | 70451 C | 8/1893 | | |
| DE | 2709207 A1 | 9/1978 | | |
| DE | 3912528 A1 | 10/1990 | | |
| EP | 0511956 A1 | 11/1992 | | |
| GB | 1494842 A | 12/1977 | | |
| JP | 59-049449 A | 3/1984 | | |
| JP | 2004-176966 A | 6/2004 | | |
| JP | 2009-148455 A | 7/2009 | | |
| WO | 9418708 A2 | 8/1994 | | |
| WO | 9704207 A1 | 2/1997 | | |
| WO | 2005098190 A1 | 10/2005 | | |
| WO | WO 2008054497 A2 * | 5/2008 | | E04D 13/18 |

OTHER PUBLICATIONS

International Search Report, issued in related international application No. PCT/US2009/064682, mailed Oct. 23, 2009.

USPTO Non-Final Office Action, issued in related U.S. Appl. No. 13/129,808, on Jan. 7, 2014.

International Search Report, issued in related international application No. PCT/US2007/008616, mailed Jul. 9, 2008.

International Search Report, issued in related international application No. PCT/US2009/064682, mailed Jun. 24, 2011.

Supplementary European Search Report, issued in related European application No. EP 07867060, dated May 28, 2013.

International Preliminary Report on Patentability and Written Opinion of the International Search Authority, issued in corresponding international application No. PCT/US2009/004839, mailed Oct. 23, 2009.

International Preliminary Report on Patentability and Written Opinion of the International Search Authority, issued in related international application No. PCT/US2007/008616, mailed Jul. 9, 2009.

USPTO Final Office Action, issued in related U.S. Appl. No. 13/129,808, on Aug. 13, 2014.

SIPO First Office Action issued in related Chinese patent application No. 200980145982.0, on Sep. 2, 2013 (partial English language translation provided).

USPTO Advisory Action, issued in related U.S. Appl. No. 13/129,808, on Dec. 4, 2014.

International Search Report, issued in corresponding international application No. PCT/US2009/004839, mailed Oct. 23, 2009.

USPTO Non-Final Office Action, issued in related U.S. Appl. No. 13/707,856, on Jul. 30, 2014.

International Search Report, issued in related international application No. PCT/US2011/039473, mailed Oct. 5, 2011.

International Preliminary Report on Patentability and Written Opinion of the International Search Authority, issued in related international application No. PCT/US2011/039473, mailed Oct. 5, 2011.

SIPO's Decision of Rejection, issued in related Chinese patent application No. 201080044463.8, May 28, 2014. (provided in the Chinese and English languages).

International Preliminary Report on Patentability and Written Opinion of the International Search Authority, issued in related international application No. PCT/US2010/051267, issued Apr. 11, 2012.

International Search Report, issued in related international application No. PCT/US2010/051267, mailed Dec. 2, 2010.

JPO's Notice of Reasons for Rejection, issued in related Japanese patent application No. 2012-533229, mailed Sep. 24, 2014.

* cited by examiner

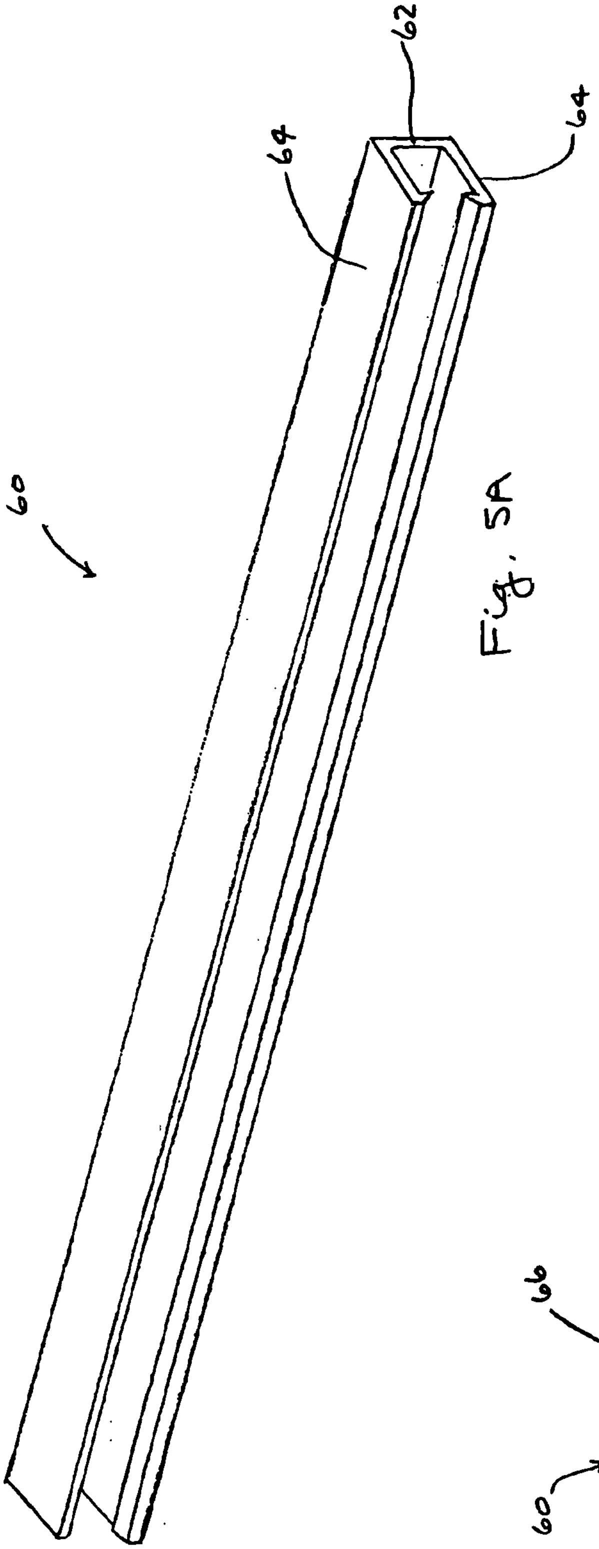
Fig. 5A
Fig. 5B
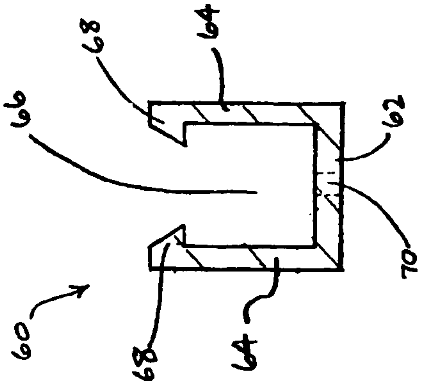

SOLAR HEATING CELLS AND SUPPORT APPARATUS THEREFOR

CROSS-REFERENCE TO RELATED APPLICATIONS

This application is a U.S. National Stage of International Application No. PCT/US2009/004839, filed on Aug. 24, 2009, and claims priority to U.S. Provisional patent application Ser. No. 61/190,151, filed on Aug. 25, 2008, the disclosure of each of which is incorporated herein by reference in its entirety.

BACKGROUND OF THE INVENTION

1. Field of the Invention

The present invention relates to the field of passive solar energy heating units which may be installed in building walls in the manner of windows.

2. Description of the Related Art

Passive solar heating units of the subject type are known in the art. For example, U.S. Pat. No. 4,532,917 to Taff et al. shows a modular passive solar energy heating unit for heating an enclosed space. The unit employs phase change heat storage material, which is optically transparent to visible light when in a high-stored-energy liquid state, enabling a viewer to see through clearly, and which is translucent milky white when in a low-stored-energy solid state for providing pleasant illumination to the enclosed space when first illuminated by sunlight in the morning.

An undesirable characteristic of this and other such modular passive solar energy heating units of the prior art is their tendency to radiate too much of the heat stored during the daylight hours back outside the building at night. As a consequence, less of the stored heat remains available to heat the building at night. In addition, the heat that does remain to be transmitted into the building does so too quickly, with the result that its benefit is felt for only a relatively short time.

International Publication No. WO 2008/054497 A2, the teachings of which are incorporated herein by reference, shows a solar heating block designed for use in assembling solar heating panels in the walls of buildings. The solar heating block has a first compartment and a second compartment within its interior volume. The first compartment contains a translucent insulating material, such as an aerogel. The second compartment, which is inward of the solar heating block from the first compartment when the solar heating block is part of a solar heating panel in a building, contains a heat-absorbing material. The translucent insulating material allows light to be transmitted through the solar heating block, but reduces heat loss to the exterior of the building from the heat-absorbing material. Insulating fabric tiles may be installed on the surfaces of the solar heating blocks inside the building to moderate the rate at which the solar heating blocks release stored heat into the room.

The solar heating blocks shown in International Publication No. WO 2008/054497 A2 stack upon and interlock with one another to form a solar heating panel essentially lacking a separate framework. A disadvantage of this approach has been that it has been necessary to disassemble, at least to some degree, the solar heating panel to repair or to replace one of its solar heating blocks. Another disadvantage has been that air bubbles, which form in the heat-absorbing material, typically a mixture primarily including water, rise to the top of the second compartment of the solar heating block and combine to form a larger bubble that remains in view from the inside of the building. Attempts to hide or remove these bubbles have heretofore not been entirely successful.

The present invention provides a solution to these and other problems of the prior art.

SUMMARY OF THE INVENTION

Accordingly, the present invention is a solar heating cell which comprises a core which is substantially in the form of a parallelepiped having two open sides opposite to one another. The core has edges extending around each of the two open sides, and has an increased thickness at the edges defining shoulders inward of the edges on an outer surface thereof. The edges have outwardly and oppositely directed channels extending thereabout.

An O-ring is disposed in each of the two channels and glass plates are held against the O-rings by compression clips having a substantially U-shaped cross section. The compression clips extend between the shoulders behind the channels housing the O-rings and the faces of the glass plates to form an air and watertight seal.

The core has a top which includes a raised portion containing a compartment. The latter is separate from the interior volume of the solar heating cell, but communicates therewith through a central gap at the top of the interior volume of the core. The top surfaces of the interior volume are pitched upward at an angle toward the central gap, so that bubbles, rising from the liquid mixture, primarily water, used to fill the interior volume, may pass from the interior volume up into the compartment.

In alternate embodiments of the solar heating cell, one or two additional glass plates, separated by a space from the glass plate which, in use, will be facing the outside of the building, are provided to create one or more insulating spaces. When there is one insulating space, it may be filled with a translucent insulating material, such as an aerogel, or an insulating gas, such as air, nitrogen, argon, krypton, or a mixture of argon and krypton. When there are two insulating spaces, they may be filled with an insulting gas, such as one of those just identified.

A solar heating panel is assembled by mounting a plurality of the solar heating cells on a support apparatus in an opening in an exterior wall of a building. The support apparatus includes a plurality of vertical frame members, which are mounted to extend vertically at spaced intervals between the top and bottom of the opening.

A plurality of L-shaped brackets are mounted at spaced intervals on the vertical frame members, defining spaces for the disposition of the solar heating cells. A plurality of cross rungs, connecting the L-shaped brackets of adjacent vertical frame members to one another on both the inside and outside of the opening, lend additional stability to the support apparatus and secure the solar heating cells, resting on the L-shaped brackets, against removal by falling or otherwise from the support apparatus.

The present invention will now be described in more complete detail with frequent reference being made to the figures identified immediately below.

BRIEF DESCRIPTION OF THE DRAWINGS

FIG. 5A is a perspective view of a cross rung of the support apparatus;

FIG. 5B is a cross-sectional view of the cross rung;

DETAILED DESCRIPTION OF THE PREFERRED EMBODIMENTS

Figure 1:
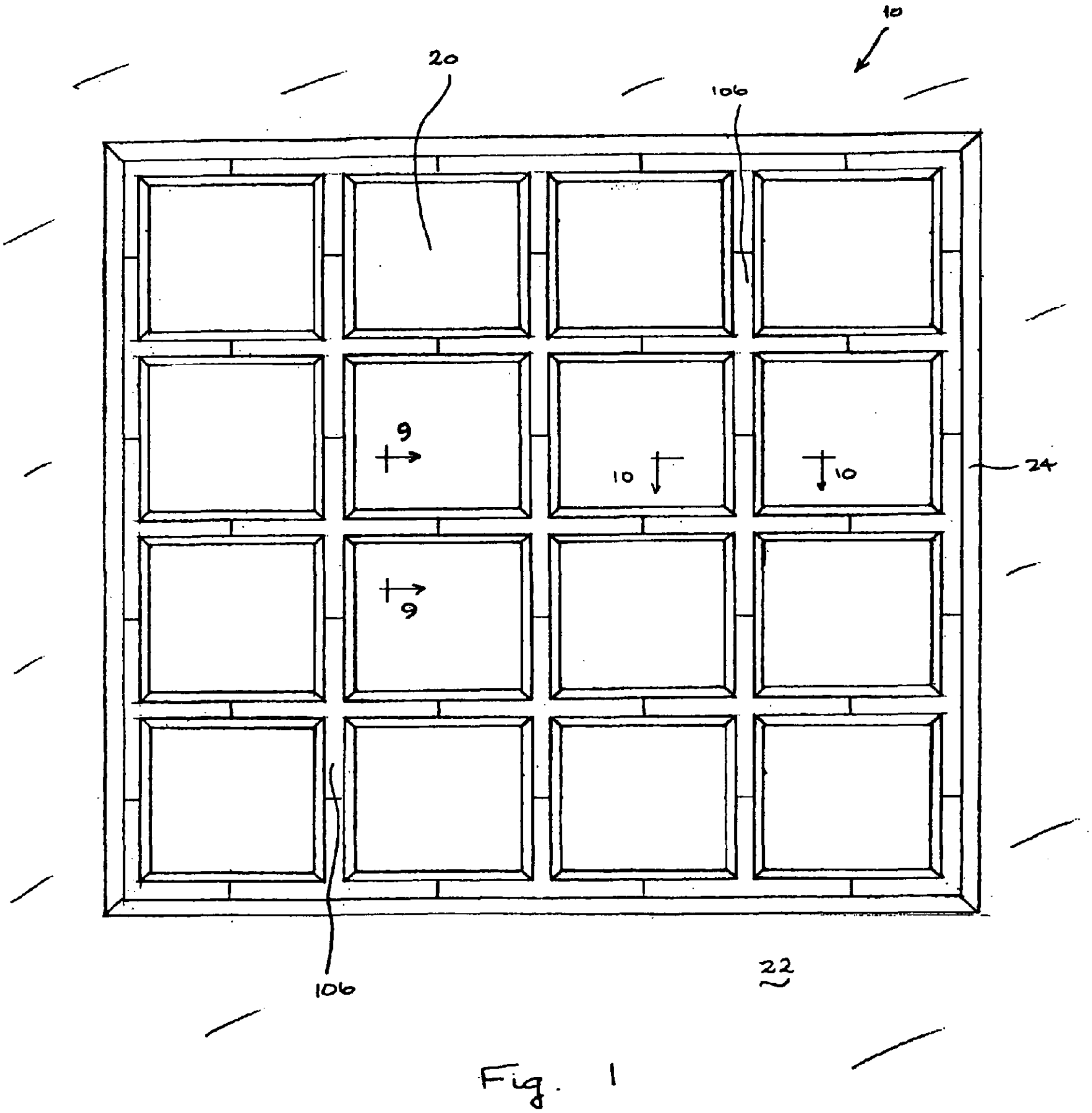
FIG. 1 is an elevational view of a solar heating panel.

Turning now to these figures, FIG. 1 is an elevational view of a solar heating panel 10 which includes the solar heating cells 20 of the present invention. The view shown in FIG. 1 is one of the panel 10 from inside a building, where panel 10 takes the place of a conventional window of any of the varieties commonly used in residential or commercial buildings. The view from outside the building, at least in its general appearance, would be very much the same as that presented in FIG. 1.

As shown in FIG. 1, solar heating panel 10 includes sixteen (16) solar heating cells 20 arranged in a 4×4 array, although such an array has been chosen solely for the purpose of illustration without any intention to so limit the present invention. Indeed, as will become quite apparent below, it is possible to mount even a single solar heating cell 20 in an external wall 22 of a building as a small solar heating panel 10. Moreover, there is no requirement that the array be either square or rectangular, as arrays of other shapes could alternatively be constructed.

Solar heating panel 10 is mounted in an opening cut in wall 22 in the manner to be described below. For the sake of appearance, as well as for structural integrity and protection from ambient environmental conditions outside the building, the panel 10 is surrounded by suitable molding 24 both inside and outside the building.

In accordance with the present invention, each solar heating cell 20 may be removed for replacement or repair independently from others in the array, regardless of its position therein, either from inside or outside the building. In other words, any one of the solar heating cells 20 may be removed from the panel 10 without disturbing any of the others. This is made possible by the support apparatus used to deploy the solar heating cells 20 in a desired array.

The Support Apparatus

Figure 2:
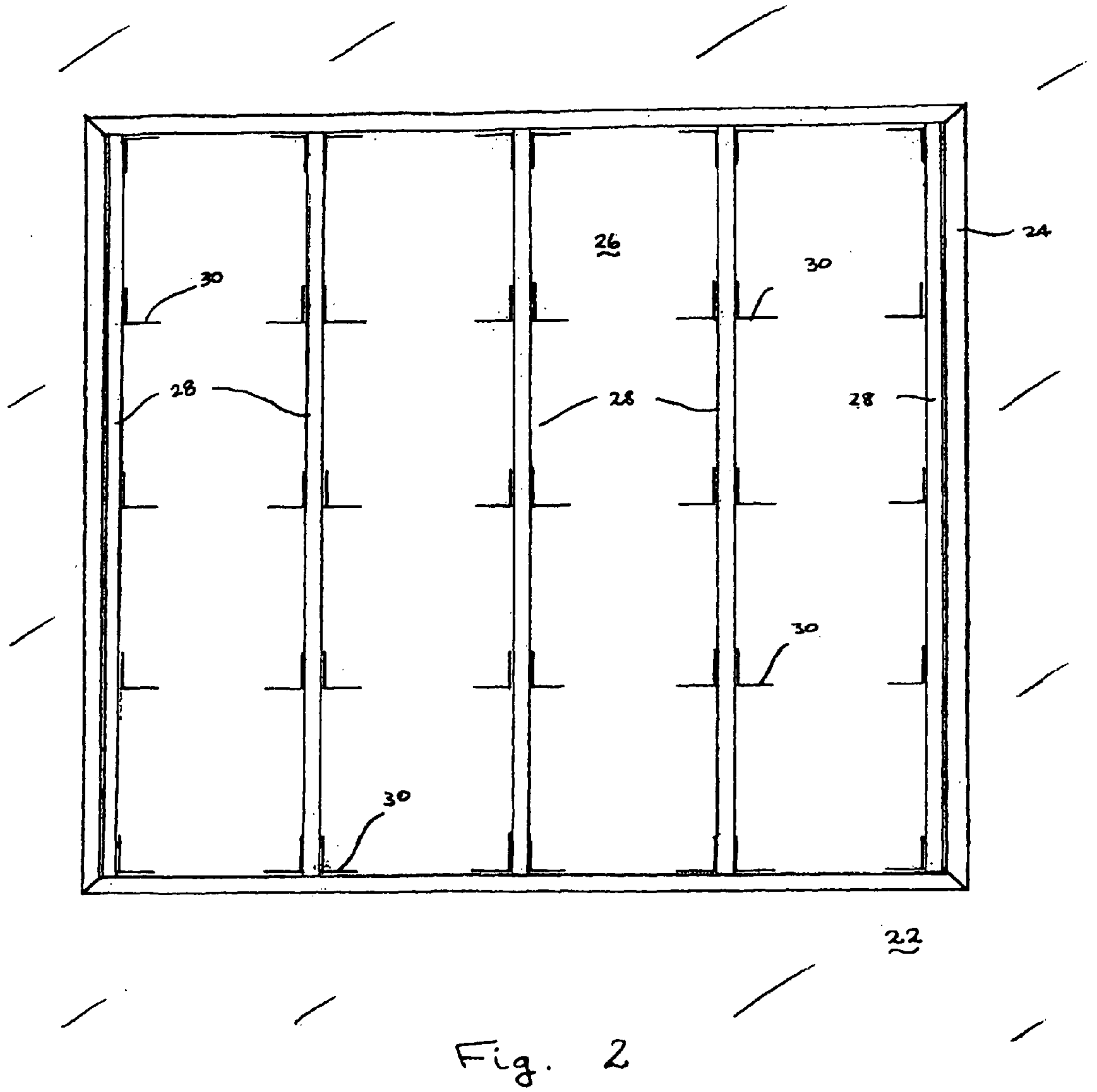
FIG. 2 is an elevational view of an opening through a wall schematically showing a portion of a support apparatus for the solar heating panel.

Referring now to FIG. 2, which is an elevational view of an opening 26 through wall 22 prior to the installation of solar heating cells 20 of the solar heating panel 10 of FIG. 1. Disposed vertically between the top and bottom of the opening 26 are several vertical frame members 28, shown somewhat schematically in FIG. 2. Two of the vertical frame members 28 are disposed adjacent to the side edges of the opening 26, which, in this example of the present invention, is in the shape of a square. The other three vertical frame members 28 are disposed between the top and bottom of the opening 28 at equal intervals across its width.

A plurality of L-shaped brackets 30 are fixedly attached to the vertical frame members 28. As shown schematically in FIG. 2, the L-shaped brackets 30 are mounted to the vertical frame members 28 at the bottom corners of the opening 26, and are mounted in an inverted orientation to the vertical frame members 28 at the top corners of the opening. The L-shaped brackets 30 are also mounted to the vertical frame members 28 adjacent to the side edges of the opening 26 at equal intervals between the top and bottom of the opening 28. Finally, with respect to the other three vertical frame members 28, L-shaped brackets 30 are mounted back-to-back to one another on either side of the vertical frame members 28 at the very bottom, at the very top (in an inverted orientation), and at equal intervals between the top and bottom of the opening 28. With reference to FIG. 2, one may visualize that vertical frame members 28 and L-shaped bracket 30 define spaces for the disposition of the several solar heating cells 20.

Figure 3A:
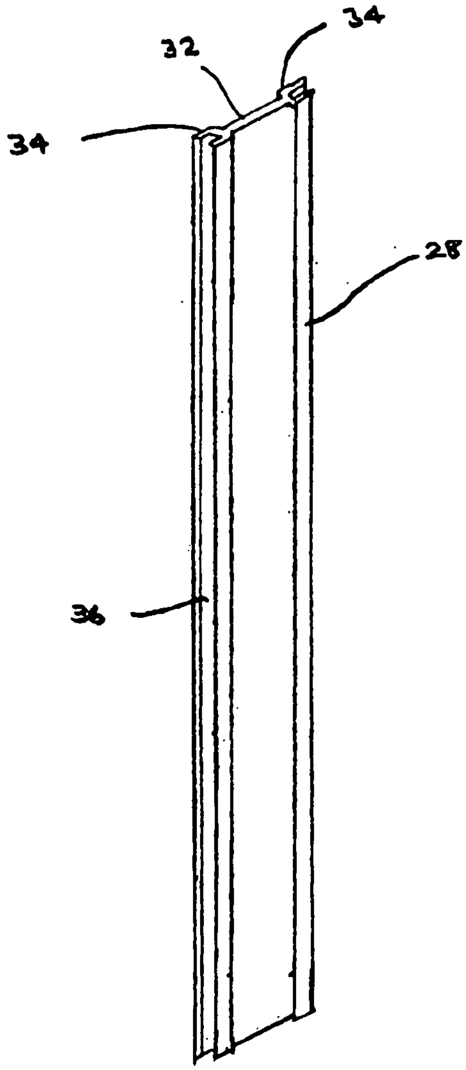
FIG. 3A is a perspective view of a vertical frame member of the support apparatus.
Figure 3B:
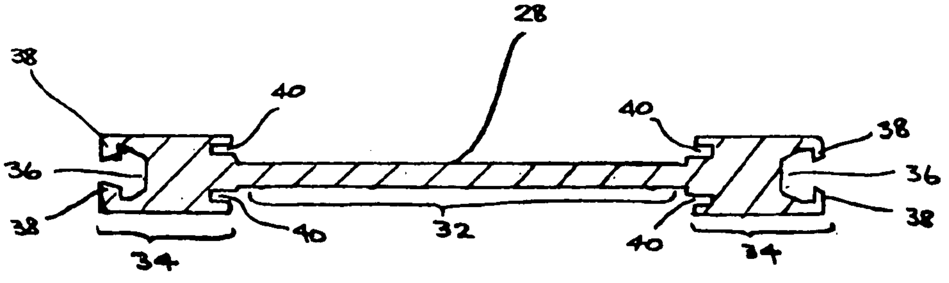
FIG. 3B is a cross-sectional view of the vertical frame member.

FIG. 3A is a perspective view of a vertical frame member 28, which may be extruded from aluminum, and FIG. 3B is a cross-sectional view thereof. The vertical frame member 28 has a relatively thin central section 32 and wider lateral sections 34. Running lengthwise along the lateral sections 34 are outwardly oriented channels 36, which have narrowed openings formed by mutually facing teeth 38. The function of the channels 36 and their teeth 38 will be described in due course.

On opposite sides of the relatively thin central section 32, inwardly facing channels 40 run lengthwise along the lateral sections 34. Channels 40 are involved with the mounting of the L-shaped brackets 30 on the vertical frame members 28.

Figure 4A:
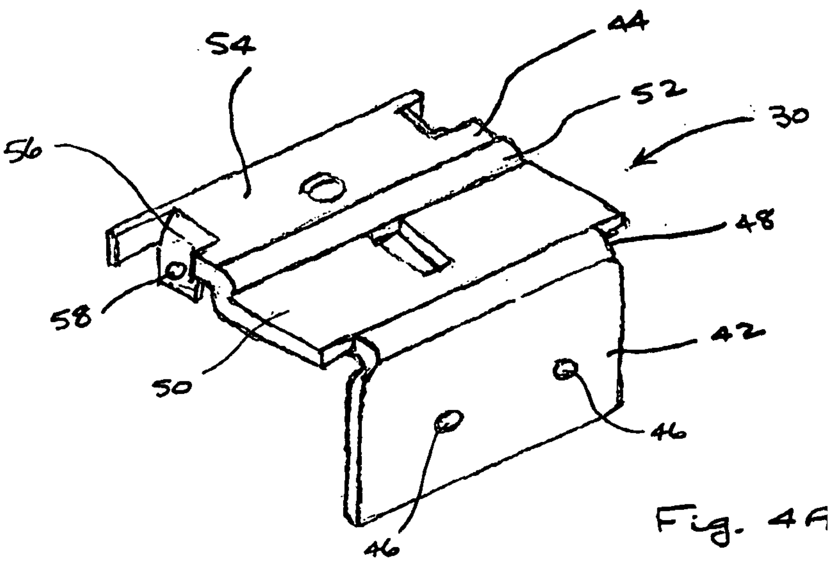
FIG. 4A is a perspective view of an L-shaped bracket of the support apparatus.
Figure 4B:
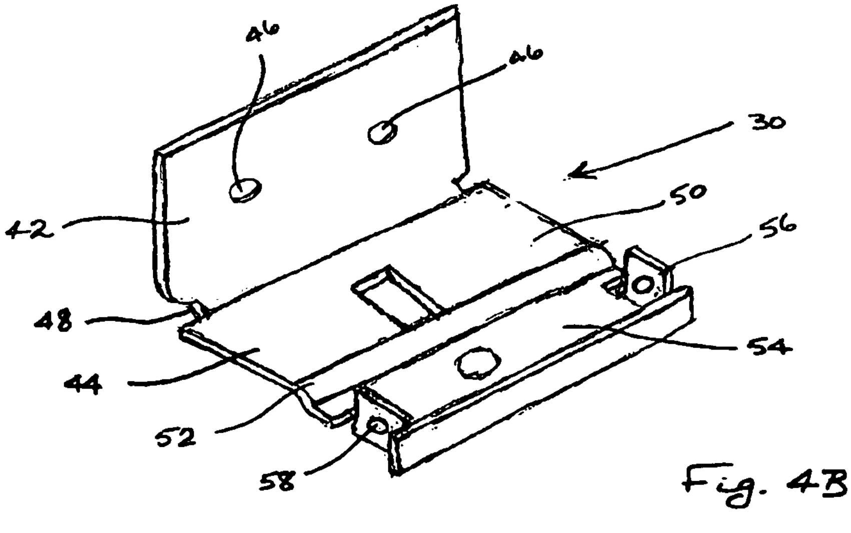
FIG. 4B is a perspective view of the side of the L-shaped bracket not shown in FIG. 4A.

FIG. 4A is a perspective view of one of the L-shaped brackets 30, and FIG. 4B is a perspective view of the side of the L-shaped bracket 30 not shown in FIG. 4A. L-shaped bracket 30, which may be stamped and shaped from steel sheet, has a vertical section 42 and a horizontal section 44, so called from their orientations as used in solar heating panel 10. It will be noted that the vertical section 42 includes a pair of holes 46, which are used when attaching the L-shaped bracket 30 to the vertical frame member 28. While the vertical section 42 is of a pre-selected width, that width narrows at the curved section 48 between the vertical section and the horizontal section 44. More specifically, the width of the vertical section 42 is substantially equal to the distance separating the bottoms of channels 40 in vertical frame member 28, so that the vertical section 42 may be slid between channels 40 and disposed at a desired location on vertical frame member 28, with the narrowed curved section 48 providing the necessary clearance past the edges of channels 40.

Referring to FIG. 4B for the moment, horizontal section 44 has a horizontal support section 50, a downwardly curved section 52, and a tab section 54. The latter has two upwardly oriented tabs 56 with holes 58. Holes 58 are so positioned that they lie in the plane formed by the horizontal support section 50, so called for reasons to be given below.

FIG. 5A is a perspective view of a cross rung 60 for the support apparatus, and FIG. 5B is a cross-sectional view thereof. Cross rung 60 has a generally U-shaped cross section with a planar bottom 62 and two sides 64 extending perpendicularly therefrom. Cross rung 60 may be extruded from aluminum. As shown in FIG. 5B, the bottom 62 and sides 64 essentially define a square, although this need not be so, enclosing a channel 66 having a narrowed opening formed by mutually facing teeth 68. The function of channel 66 and teeth 68 will be described in due course. The bottom 62 of cross rung 60 is provided with holes 70 for use in connecting cross rungs 60 to L-shaped brackets 30.

Figure 6:
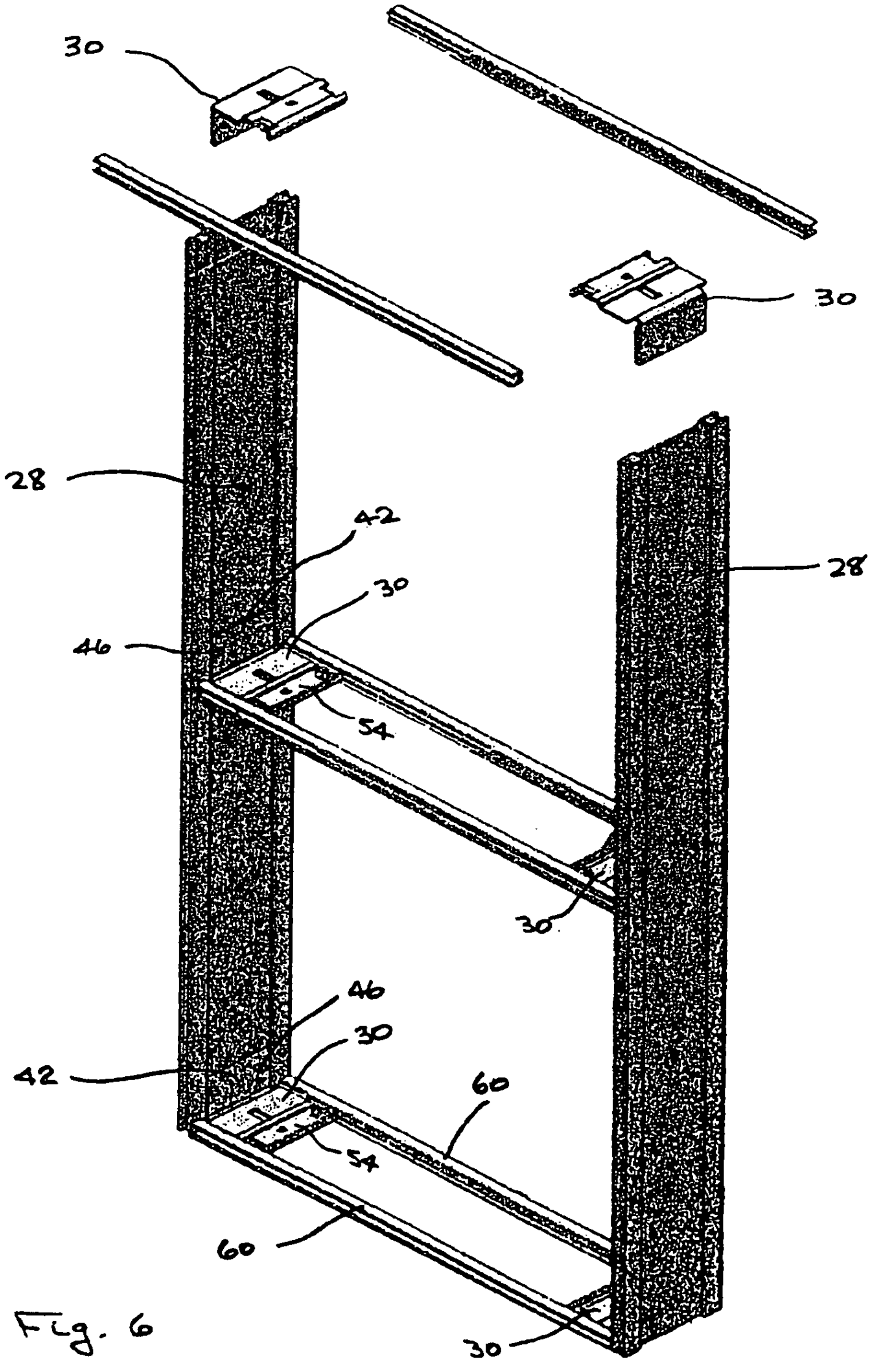
FIG. 6 is a partially exploded perspective view illustrating the assembly of the support apparatus.

FIG. 6 is a partially exploded perspective view illustrating the assembly of vertical frame members 28, L-shaped brackets 30, and cross rungs 60 to form a support apparatus. FIG. 6 is provided for the purpose of illustration; the support apparatus, shown schematically in FIG. 2, is not shown in FIG. 6.

As shown in FIG. 6, L-shaped brackets 30 are disposed at desired positions on vertical frame members 28, with those at the very top being installed in an inverted orientation as previously noted above. Holes 46 in vertical sections 42 of L-shaped brackets 30 enable L-shaped brackets 30 to be secured to vertical frame members 28 with rivets, screws, or the like, passing through central sections 32 thereof. Although not shown in FIG. 6, but shown schematically in FIG. 2, where some L-shaped brackets 30 are disposed in a back-to-back relationship, the screws, rivets, or the like are used to attach both of the back-to-back L-shaped brackets 30 at the desired position. Cross rungs 60 are mounted as shown in FIG. 6 and are attached, on both sides of the L-shaped brackets 30 to tabs 56 by directing screws, rivets, or the like through holes 70 in the bottoms 62 of cross rungs 60 into and through holes 58 in tabs 56 in the tab sections 54 of L-shaped brackets 30. Because holes 58 lie in the same plane as horizontal support sections 50, as noted previously, bottoms 62 of cross rungs 60 become firmly pressed against horizontal support sections 50 when connected thereto. As a consequence, vertical frame members 28, L-shaped brackets 30, and cross rungs 60 together form a very rigid and stable support apparatus.

The Solar Heating Cell

Figure 7:
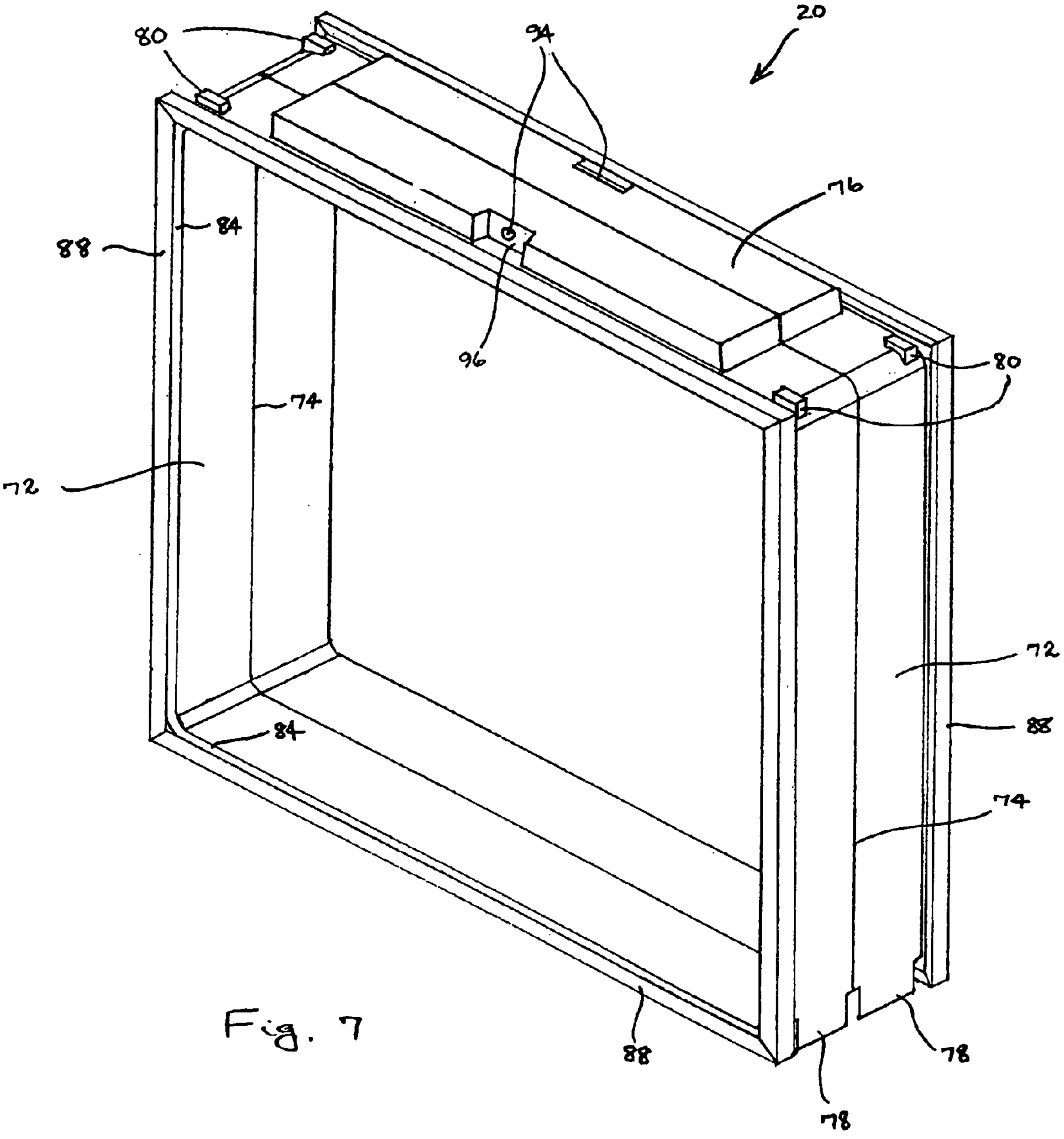
FIG. 7 is a perspective view of the solar heating cell of the present invention.

FIG. 7 is a perspective view of the solar heating cell 20 of the present invention. The solar heating cell 20 comprises a pair of molded core halves 72 which are hot-plate welded to one another along seam 74. The core halves 72 may be molded from polypropylene using techniques well known to those of ordinary skill in the art.

It will be noted that the top of the solar heating cell 20 has a raised portion 76. In fact, raised portion 76 contains a compartment whose purpose will be made clear in the discussion to follow.

At the bottom of each side of both core halves 72 is a support foot 78. Although not apparent from the perspective taken in FIG. 7, support feet 78 extend somewhat below the entire structure of the solar heating cell 20 such that the cell 20 is supported in a standing position by these feet 78. In the solar heating panel 10, each solar heating cell 20 is installed in the support apparatus previously described with the support feet 78 resting on the horizontal support sections 44 of the L-shaped brackets 30.

Moreover, at the top of each side of both core halves 72 is a stud 80. Studs 80 essentially make it impossible for the solar heating cell 20 to tip and fall out of the support apparatus previously described, as they hit the horizontal support sections 44 of the L-shaped brackets 30 immediately above when slightly tipped to prevent any further tipping. As a consequence, the only way to get a solar heating cell 20 out of the support apparatus is to deliberately pull it straight out, when cross rungs 60 are not in place at its top and bottom.

Figure 8:
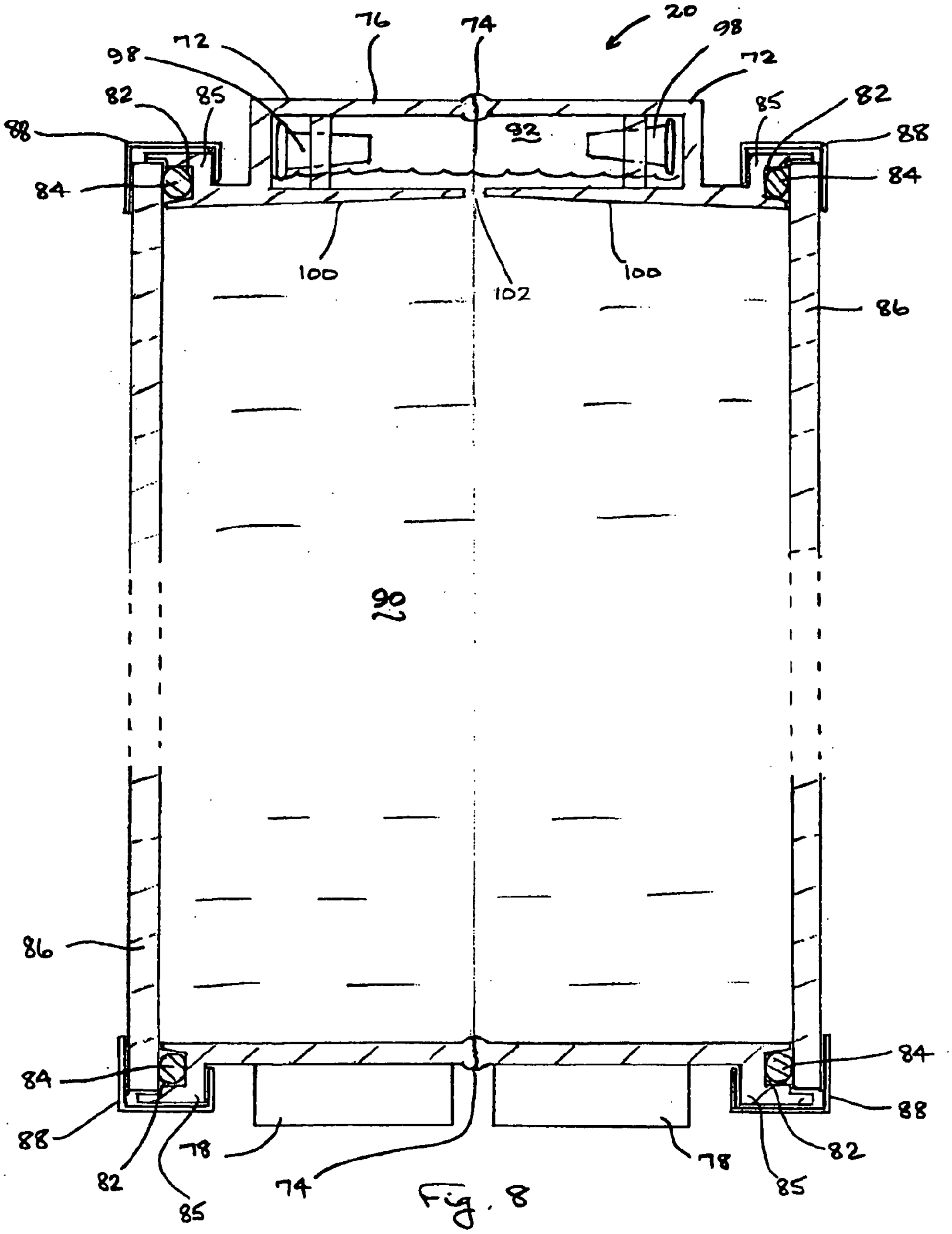
FIG. 8 is a cross-sectional view taken vertically through the solar heating cell.

Turning to FIG. 8, a cross-sectional view taken vertically through the solar heating cell 20, each core half 72 includes a channel 82 opposite to seam 74. Behind channel 82 is a shoulder 85. Within each circumferential channel 82 is an O-ring 84, which may be made from EPDM (ethylene-propylene diene monomer) rubber. O-rings 84 enable a watertight seal to be formed when glass plates 86 are clamped to the core halves 72 with compression clips 88.

Solar heating cell 20 may be in the shape of a square sixteen (16) inches on a side, although the present invention is not limited to solar heating cells 20 of that dimension. As the solar heating cells are ultimately filled with a liquid mixture principally comprising water, the size of the solar heating cell 20 will be limited ultimately by the weight of the filled cell, and, more specifically, by the tendency of a large, heavy cell to eventually leak or for its glass plates 86 to break in response to the pressure of the liquid mixture within.

Where the solar heating cell 20 is of the size indicated, the glass plates 86 may be of a thickness of 6.0 mm. Such a thickness is able to stand the pressure generated by 16 inches of water without breaking.

The compression clips 88 may be of stainless steel or extruded aluminum. Specifically, compression clips 88 have a substantially U-shaped cross section, extend between shoulders 85 and glass plates 86, and compress the glass plates 86 against O-rings 84 around the entire perimeters of each core half 72 by pushing glass plates 86 toward shoulders 85. In FIG. 7, the O-ring 84 is partly visible adjacent to compression clips 88.

Once assembled, solar heating cells 20 include an interior volume 90 for a liquid mixture primarily comprising water. The water may include antifreeze and antimicrobial agents, such as table salt (sodium chloride), calcium chloride, or copper sulfate, which function both as antifreeze and antimicrobial agents. In addition, distilled water may be used to minimize the mineral and microbial content of the water being used to fill the interior volume 90 of the solar heating cell 20. By filling the interior volume 90 with hot water, or with water that has previously been deaerated or degassed, the formation of bubbles on the inner surfaces of solar heating cell 20 may be kept to a minimum. A wetting agent or surfactant may be added to the water before filling the interior volume 90 to reduce the tendency for any bubbles which may form to cling to the inside surfaces of the glass plates 86 or core halves 72.

As noted above, raised portion 76 on top of the solar heating cell 20 contains a compartment 92. In practice, the solar heating cell 20 is filled with the liquid mixture up to the level shown in FIG. 8, namely, to a point within the compartment 92 but below the level of holes 94, one of which is shown clearly in FIG. 7, within recessed portion 96 of raised portion 76. Plugs 98 are used to close holes 94 when the solar heating cell 20 is filled to the desired level:

It will be noted in FIG. 8 that the top surface 100 of each core half 72 is pitched upwardly within interior volume 90 toward a central gap 102 leading from interior volume 90 to compartment 92, the purpose of which may now be made clear. Any bubbles which may form in the liquid mixture used to fill the interior volume 90 of the solar heating cell will rise, encounter the inclined top surfaces 100, and move along top surfaces 100 toward and through central gap 102 into compartment 92. Accordingly, compartment 92 provides the bubbles with a place to go, so that they may be removed from the interior volume 90 to improve the aesthetic appearance of the solar heating cell 20 as a whole. It has been found that an inclination of less than 5° will accomplish this end.

Finally, additional liquid mixture may be introduced into the solar heating cell 20 at any time, should the level of the liquid mixture fall to a point below central gap 102, through evaporation or release of air bubbles, through a hole 94 upon temporary removal of its plug 98.

The Solar Heating Panel

Figure 9:
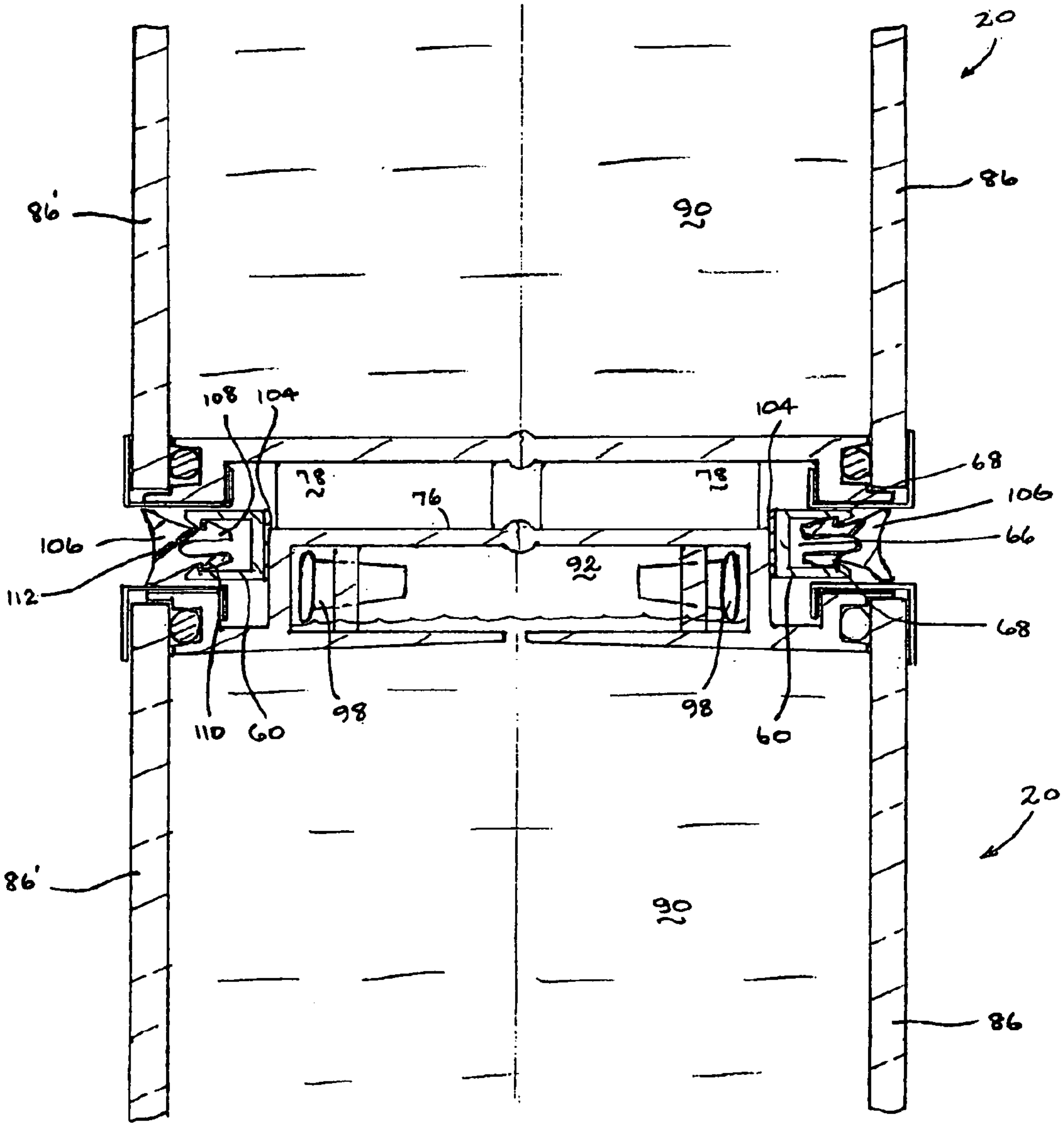
FIG. 9 is a vertical cross-sectional view taken as indicated in FIG. 1.

Referring now back to FIG. 1, solar heating panel 10 is depicted there in an elevational view from a point inside a building. FIG. 9 is a vertical cross-sectional view taken as indicated in FIG. 1, and, as a consequence, the inside of the building is on the right side of FIG. 9, while the outside of the building is on the left side.

FIG. 9 is similar, in some respects, to FIG. 8, and shows a cross section, taken in the vertical direction, of one solar heating cell 20 atop another in a solar heating panel 10. Cross rungs 60 are on each side of raised portion 76 of the lower solar heating cell 20 in FIG. 9, as is the case with every one of the solar heating cells 20 in the panel 10, as well as at the bottom of the bottommost cells 20 in the panel 10. Cross rungs 60 ensure that solar heating cells 20 are centered on the support apparatus. If desired, foam pads 104 may be disposed between cross rungs 60 and raised portion 76.

It is important to note here that each solar heating cell 20 in the solar heating panel 10 may be removed individually for repair or replacement from either inside or outside of the building. All that need be done is to remove cross rungs 60 at the top and bottom of the solar heating cell 20 to be removed, either inside or outside the building, and then to remove the cell 20 by pulling it straight out, as the raised portion 76 and the support feet 78 would no longer be blocked by the cross rungs 60. Moreover, if it becomes necessary to add liquid to any solar heating cell 20, all that need be done is to remove cross rung 60 at the top thereof, either inside or outside of the building, to remove plug 98 made accessible upon the removal of the cross rung 60, to add the necessary liquid, and to replace the plug 98 and cross rung 60. It will be noted that, because holes 94 are in recessed portions 96 of raised portion 76, plugs 98 are inward of and do not interfere with cross rungs 60. Most importantly, in the present invention, the space, namely, compartment 92, provided for air bubbles rising from the liquid filling the cells 20, is hidden from view behind cross rungs 60.

It has been previously noted in the description of the cross rung 60 that cross rungs 60 each have a channel 66 with a narrowed opening formed by mutually facing teeth 68. Referring to FIG. 9, a caulking strip 106 is inserted in channel 66 of each cross rung 60. More particularly, the caulking strip 106 is actually cruciform or cross-shaped, as shown in FIG. 1. The cruciform strips 106 are trimmed, as required, when they are installed along an edge or at a corner of the molding 24 around the solar heating panel 10.

The cruciform strip 106, which may be of a rubber or of some other resilient polymeric material, seals the openings between the solar heating cells 20 and between the solar heating cells 20 and the edges and corners of the molding 24 around the opening in which the solar heating panel 10 is installed, and prevents air from passing into or out of the building through those openings. Cruciform strips 106 make a positive interlocked connection with cross rungs 60 and, as will be seen later, with vertical frame members 28, because they include a pair of resilient prongs 108 with outwardly directed teeth 110. The latter establish a positive interlock with teeth 68 in channel 66 of cross rung 60 to firmly hold the cruciform strip 106 in place. The smooth outer surface 112 of the cruciform strip 106 presents a pleasing appearance between adjacent cells 20 and between cells 20 and the edges and corners of the opening.

Turning now to glass plates 86, 86' in FIG. 9, glass plates 86' on the outside of the building, that is, on the left side in FIG. 9, are preferably of glass having a high solar heat gain coefficient and a low-e (low emissivity) coating on its outwardly facing side. Such a glass will permit the sun's rays to heat the liquid mixture in the solar heating cell 20 almost as effectively as common window glass, yet will not permit a large heat flow outwardly from the solar heating cell 20 to the exterior of the building, thereby keeping the heat stored by the liquid mixture available for the supplemental heating of the building. By the same token, during the summer months, when it is warm outside the building, low-e glass will reduce the amount of heat transmitted from outside through the glass and into the liquid in the interior volume 90 of the solar heating cell 20. On the other hand, glass plates 86 on the inside of the building, that is, on the right side in FIG. 9, may be either clear (super clear low-iron glass) or tinted, as may be desired for aesthetic reasons or to absorb some light energy.

Referring, again, back to FIG. 1, FIG. 10 is a cross-sectional view taken as indicated in FIG. 1, and, as a consequence, the inside of the building is at the bottom of FIG. 10, while the outside of the building is at the top of the figure.

Figure 10:
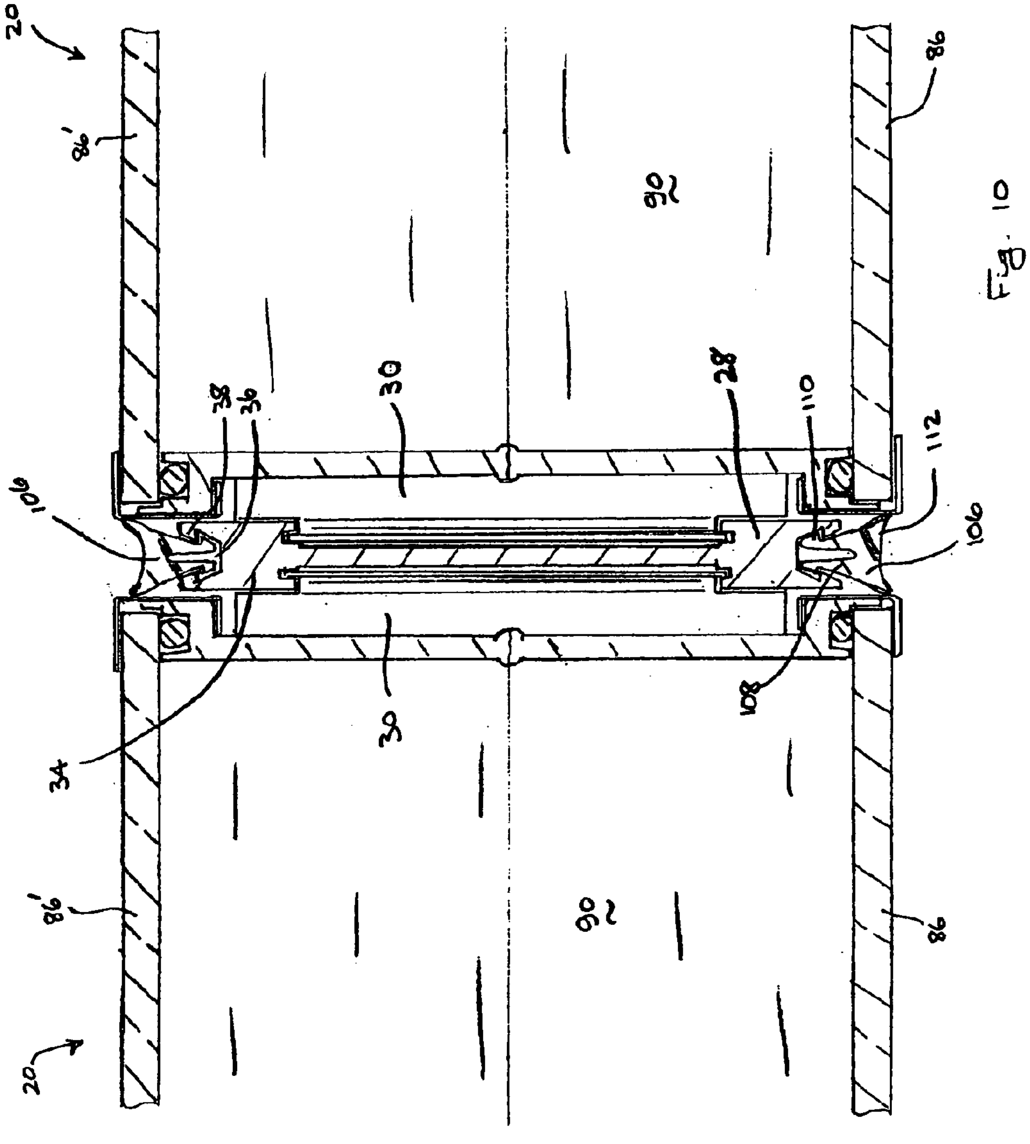
FIG. 10 is a horizontal cross-sectional view taken as indicated in FIG. 1.

FIG. 10 is a horizontal cross-sectional view showing two laterally adjacent solar heating cells 20 on either side of the vertical frame member 28 separating them. As previously noted in the description of the vertical frame member 28, outwardly oriented channels 36, which have narrowed openings formed by mutually facing teeth 38, run lengthwise along lateral sections 34. As was the case with cross rungs 60, cruciform strips 106 make a positive interlocked connection with vertical frame members 28, because of their pair of resilient prongs 108 with outwardly directed teeth 110. The latter establish a positive interlock with teeth 38 in channels 36 of vertical frame members 28 to firmly hold the cruciform strip 106 in place.

It should be noted that the embodiment shown in FIGS. 9 and 10, in practice, is behind one or two large glazings on the outside of the building. Where there are two such glazings, or large panes of glass, they are spaced from one another, and have an insulating gas between them, as is well known in the art. The one or two large glazings insulate the solar heating panel 10 from the outside air, and preferably have a high solar heat gain coefficient. They help the solar heating panel 10 to act as a temperature moderator, absorbing excess solar heat gain during the day and allowing absorbed heat to moderate out at night.

Additional Embodiments

In additional embodiments of the present invention, an integrated system is formed by incorporating an insulator on the outward side of each solar heating cell.

Figure 11:
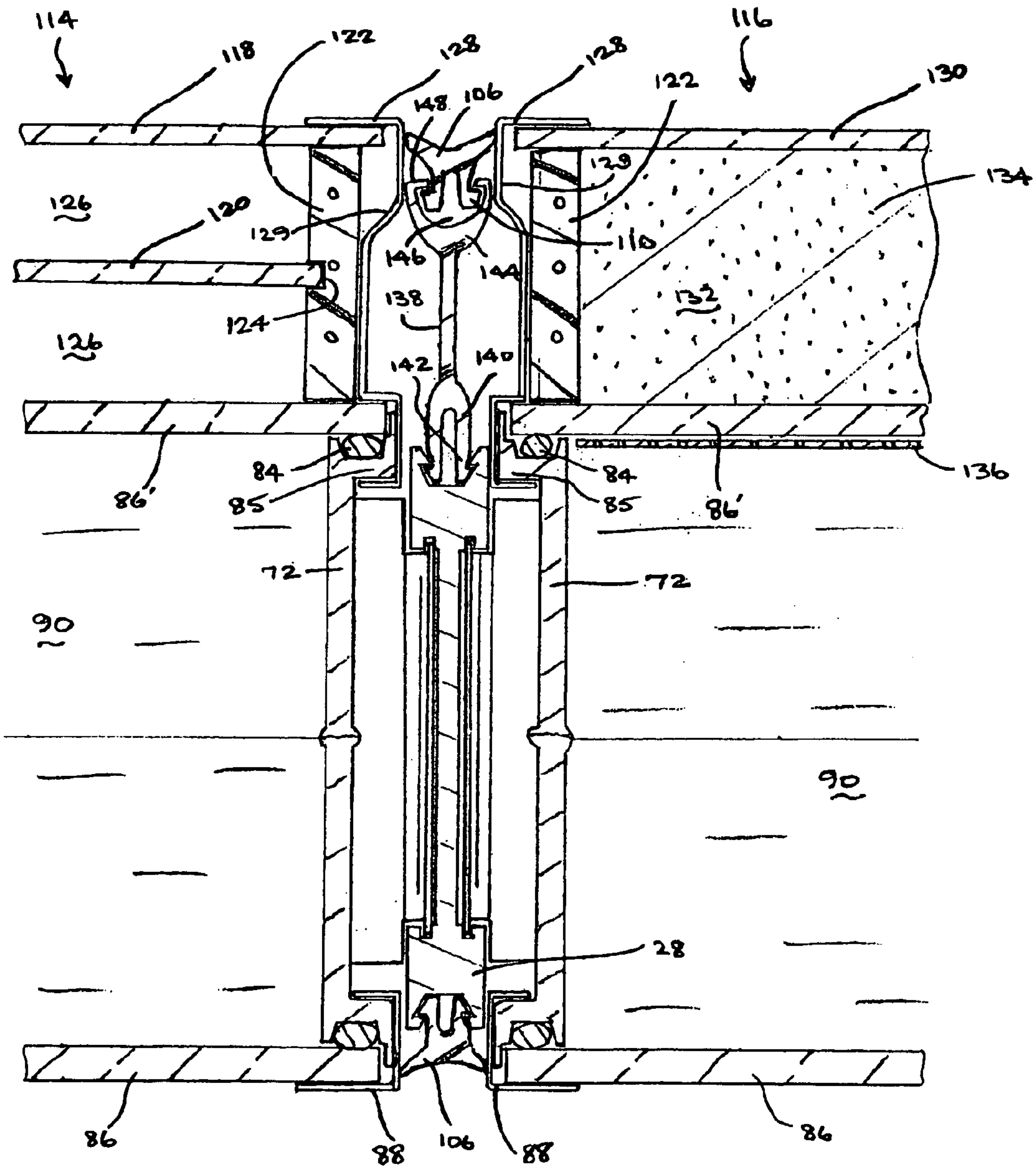
FIG. 11 is a horizontal cross-sectional view taken in the same manner as FIG. 10 and showing two alternate embodiments of the solar heating cell.

FIG. 11, like FIG. 10, is a horizontal cross-sectional view showing two laterally adjacent solar heating cells 114, 116 on either side of the vertical frame member 28 separating them. FIG. 11 is taken in the same manner as FIG. 10, and, as a consequence, the inside of the building is at the bottom of FIG. 11, while the outside of the building is at the top of the figure.

Solar heating cells 114, 116 are two additional embodiments of the solar heating cells 20 heretofore described. Depicted together in FIG. 11 for the sake of convenience, solar heating cells 114, 116 would not necessarily be used side-by-side one another in a solar heating panel 10, although they could be so used. Each of the solar heating cells 114, 116 has additional elements, provided for insulation and lacking in solar heating cells 20, on the sides of the solar heating cells 114, 116 outside the building. Of course, solar heating cells 114, 116 are thicker than the solar heating cells 20 shown in FIG. 10, as can be seen by comparison as FIG. 11 is drawn to the same scale as FIG. 10.

Turning first to solar heating cell 114 on the left side of FIG. 11, cell 114 includes an additional glass plate 118 separated from the outer glass plate 86'. Optionally, there may be a second additional glass plate 120 between outer glass plate 86' and additional glass plate 118.

Additional glass plate 118, and, optionally, second additional glass plate 120, are mounted on and separated from outer glass plate 86' by a spacer 122, which will have a slot 124, if necessary, for maintaining the optional second additional glass plate 120 at a desired position between glass plate 86' and additional glass plate 118. Spacer 122, which is of approximately 0.75-inch width and is commercially available from Edgetech IG Inc. of Cambridge, Ohio as SUPER SPACER®, is extruded from polymer foam, which preferably includes a desiccant to remove any water vapor that may be trapped between glass plates 86', 118, 120 during the manufacturing process. Spacer 122 may include no metal to minimize heat transfer from the solar heating cell 114, although, alternatively, spacer 122 may include an aluminum foil backing layer to reduce the moisture permeability thereof.

Spacer 122 is disposed about the perimeter of glass plate 86' inward of its edges. Subsequently, second additional glass plate 120 is mounted with an adhesive, if necessary, in slot 124 which runs about the inside of the now upstanding spacer 122. Finally, glass plate 118 is disposed over spacer 122, and attached thereto with an adhesive. This action allows the spacer 122 to make a firm, airtight seal with the two glass plates 86', 118.

As a consequence, outer glass plate 86' is transformed into a glass panel having one or two, if optional glass plate 120 is included, insulating spaces 126, which may be filled with dry nitrogen or air having little water vapor, whatever water vapor being present to be ultimately removed by the desiccant included in the spacer 122. Preferably, however, insulating spaces 126 are filled with the noble gases argon, or krypton, or a mixture thereof. Relative to nitrogen or air, which is primarily nitrogen, these noble gases conduct heat much more poorly, and, consequently, provide better insulation. Both argon and krypton are present in air in extremely small amounts, although krypton is much scarcer than argon. While both gases are obtained through the fractional distillation of liquid air, the cost of a given amount of krypton is much higher than that of argon because of its relative scarcity. Because the thermal performance of krypton is better than that of argon, a mixture of argon and krypton may be used to obtain some benefit of the excellent thermal performance of krypton at a lower cost.

Compression clip 128, like compression clips 88 previously described, clamps glass plate 86' to core half 72 and forms a seal between O-ring 84 and glass plate 86'. In addition, section 129 of substantially L-shaped cross section of compression clip 128 presses glass plate 118 toward glass plate 86' to maintain an air-tight seal between spacer 122 and glass plates 86', 118. Compression clip 128, like compression clips 88, may be of stainless steel. Alternatively, compression clip 128 may be extruded from a plastic material, such as polyvinyl chloride (PVC), or may be of a pultruded composite plastic, for minimizing heat conduction out of a building. Compression clips 128 are used around the entire perimeter of solar heating cell 114.

Turning now to the glass plates 86, 86', 118, 120 of solar heating cell 114, outer glass plate 86' and additional glass plate 120 are preferably of glass having a high solar heat gain coefficient and low-e (low emissivity) coatings on their outwardly facing sides. Alternatively, outer glass plate 86' may be of ordinary clear glass or of a tinted glass. Additional glass plate 118, the outermost plate, may be of super clear low-iron glass. Glass plate 86 on the inside of the building, that is, on the bottom in FIG. 11, may either be clear or tinted, as may be desired for aesthetic reasons and to absorb some light energy.

Now, turning to solar heating cell 116 on the right side of FIG. 11, cell 116 includes an additional glass plate 130 separated from outer glass plate 86' by a spacer 122 of the variety described above, but lacking a slot 124. As before, spacer 122 is disposed about the perimeter of glass plate 86' inward of its edges and attached thereto with an adhesive. Subsequently, glass plate 130 is disposed over spacer 122, and attached thereto with an adhesive. This action allows the spacer 122 to make an firm, air-tight seal with the two glass plates 86', 130.

As a consequence, outer glass plate 86' is transformed into a glass panel having an insulating space 132. Insulating space 132 is filled with a translucent insulating material 134. The purpose of translucent insulating material 134 is to prevent heat stored in the solar heating cell 116 during the daylight hours from transferring or flowing outward during the nighttime hours. In addition, the translucent insulating material 134 allows solar radiation from outside the building to pass through the solar heating cell 116 to provide natural illumination to the interior of the building and to heat the liquid mixture within the interior volume 90 of the solar heating cell 116.

The translucent insulating material 134 of choice is aerogel, a unique form of highly porous silica having a lattice network of glass strands with very small pores. The solids content of aerogel is extremely low (5% solid, 95% air). Aerogel is recognized to be one of the most lightweight and best insulating solids in the world. An aerogel highly suited for the practice of the present invention is available from Cabot Corporation of Billerica, Mass. under the name NANOGEL®. These aerogels are produced in a method which renders them hydrophobic with the result that they repel water which otherwise tends to degrade its component particles, which are generally in a size range from 0.5 mm to 4.0 mm.

Insulating space 132 is filled with the translucent insulating material 134 at ambient atmospheric pressure. When it has been completely filled, the opening through which the material 134 is introduced is sealed. Subsequently, compression clip 128, as above, clamps glass plate 86' to core half 72 and forms a seal between O-ring 84 and glass plate 86'. In addition, compression clip 128 presses glass plate 130 toward glass plate 86' to maintain an air-tight seal between spacer 122 and glass plates 86', 130. Further, bearing in mind that spacer 122 has an initial width of approximately 0.75 inch and, being of a polymeric foam, is compressible, compression clip 128 is designed to reduce the width by a small amount, for example, to 0.71 inch, thereby reducing the volume of insulating space 132 by a small amount, by pulling glass plate 130 toward glass plate 86' by that amount, thereby compressing the translucent insulating material 134 between the glass plates 86', 130 to lock its component particles into fixed positions to prevent settling.

Turning now to the glass plates 86, 86', 130 of solar heating cell 116, glass plate 86' may be of clear or tinted glass. Additional glass plate 130 may be of super clear low-iron glass to allow the maximum amount of solar energy to enter and pass through the solar heating cell 116 to heat the liquid mixture in the interior volume 90 and to light the interior of the building. Preferably, the glass plate 86 on the inside of the building, that is, on the bottom of solar heating cell 116 in FIG. 11, is frosted.

Within interior volume 90 of solar heating cell 116, and adjacent to or adhered to the outer glass plate 86', is a heat-absorbing mask 136. The heat-absorbing mask 136 may be a perforated plate which is black on one side and white, or some other light color, on the other side. The perforations take up from 20% to 50% of the area of the heat-absorbing mask 136, so that the area not represented by the perforations is from 50% to 80% of the total area thereof. The heat-absorbing mask 136 is oriented so that the black side faces outwardly toward the exterior of the building, while the white or light side faces inwardly toward the interior of the building. As such, the heat-absorbing mask absorbs light energy without coloring the light and leaves a white surface to the inside, dimming the light without coloring it. A heat-absorbing mask 136 may be used in the same manner and with the same effect in solar heating cell 114.

As before, cruciform strips 106 are used to seal the openings between the solar heating cells 114, 116, and between the solar heating cells 114, 116 and the edges and corners of the molding 24 around the opening in which the solar heating panel 10 is installed. However, because of the increased thickness of solar heating blocks 114, 116 relative to solar heating blocks 20, extension members 138 are required to extend between vertical frame members 28 and cross rungs 30, not shown in FIG. 11, and the outer sections 129 of substantially L-shaped cross section of compression clips 128 of solar heating blocks 114, 116, so that the cruciform strips 106 can carry out the functions previously described.

Extension member 138 is an elongated element, viewed in cross section in FIG. 11, extruded from a polymeric resin material, such as polyvinyl chloride (PVC), or made from some other low-heat-conducting material to avoid thermal transfer. Extension members 138 may be provided in lengths equal to those of the vertical frame members 28 and the cross rungs 30, so that, when solar heating cells 114, 116 are installed in the support apparatus, the extension members 138, cut to appropriate lengths, may be installed between them on the outside of the building so that the cruciform strips 106 may be installed as previously described.

Referring to FIG. 11, extension member 138 includes a pair of resilient prongs 140 with outwardly directed teeth 142. The latter establish a positive interlock with teeth 38 in channels 36 of vertical frame members 28, and with teeth 68 in channels 66 of cross rungs 60, not shown, to firmly hold extension member 138 in place on the support apparatus. Extension member 138 also has a channel element 144 defining a channel 146 with inwardly directed teeth 148, sot that outwardly directed teeth 110 of cruciform strip 106 may establish a positive interlock therewith.

Figure 12:
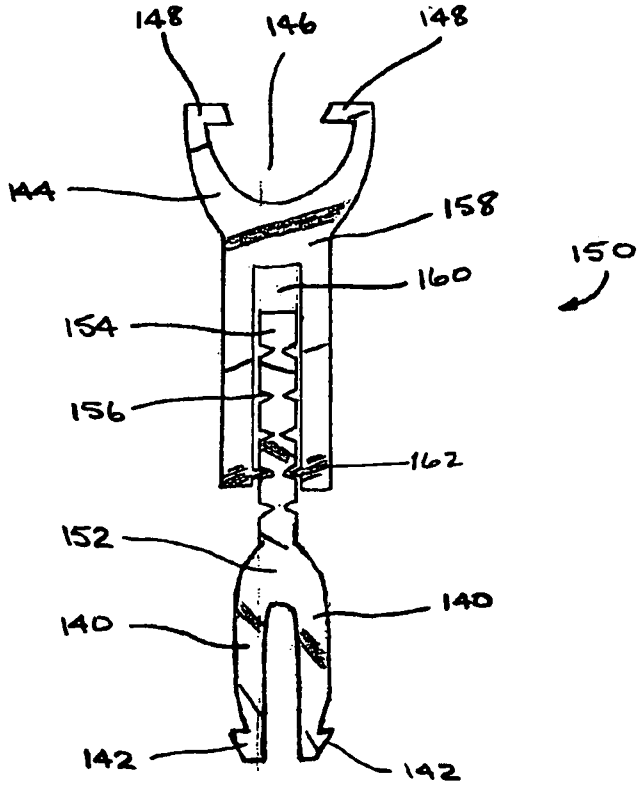
FIG. 12 is a cross-sectional view of an extension member for the support apparatus.

FIG. 12 is a cross-sectional view of an alternative extension member 150, wherein elements identical to those in extension member 138 are identically numbered. Rather than having a fixed width, from teeth 142 to teeth 148, as was the case with extension member 138, the width may be varied or adjusted to suit the requirements of a specific situation, as the prong portion 152 has a planar element 154 with a plurality of notches 156 and the channel portion 158 has a slot 160 with teeth 162, which cooperate with the notches 156 to fix the width of the extension member 138.

Having thus described the present invention in detail, it should be understood that modifications thereto would be obvious to those of ordinary skill in the art, but they would not bring the invention so modified beyond the scope of the appended claims.

What is claimed is:

1. A solar heating cell comprising:

a core, said core being substantially in the form of a parallelepiped having two open sides opposite to one another, said core having an edge extending around each of said two open sides, said core further having an increased thickness adjacent to said edges defining shoulders inward of said edges on an outer surface thereof, said edges having outwardly and oppositely directed channels extending thereabout;

a first O-ring and a second O-ring, said first O-ring being disposed in said channel on one of said two sides of said core and said second O-ring being disposed in said channel on the other of said two sides of said core;

a first glass plate and a second glass plate, said first glass plate being on one of said two sides of said core in contact with said first O-ring and said second glass plate being on the other of said two sides of said core in contact with said second O-ring; and a plurality of elongated compression clips of substantially U-shaped cross section, said compression clips extending between said shoulders and said first glass plate and between said shoulders and said second glass plates to compress said first glass plate against said first O-ring and said second glass plate against said second O-ring, thereby enclosing an interior volume of said solar heating cell, wherein said interior volume is adapted for being substantially filled with a heat absorbing material.

2. A solar heating cell as claimed in claim 1 wherein said core comprises first and second core halves, said first and second core halves being hot-plate welded to one another forming a seam therebetween.

3. A solar heating cell as claimed in claim 2 wherein said first and second core halves are molded from polypropylene.

4. A solar heating cell as claimed in claim 1 wherein said core has a top, said top having a raised portion, said raised portion containing a compartment, said compartment being separate from said interior volume of said solar heating cell and communicating therewith through a central gap.

5. A solar heating cell as claimed in claim 4 wherein top surfaces of said interior volume are pitched upward at an toward angle said central gap.

6. A solar heating cell as claimed in claim 5 wherein said angle is less than 5°.

7. A solar heating cell as claimed in claim 4 wherein said raised portion includes a hole, and further comprising a plug in said hole, whereby said solar heating cell may be filled with a liquid mixture or may have liquid mixture added at any time, and said hole may be subsequently closed.

8. A solar heating cell as claimed in claim 1 wherein said first and second O-rings are of EPDM (ethylene-propylene diene monomer) rubber.

9. A solar heating cell as claimed in claim 1 wherein said interior volume is filled with a liquid mixture.

10. A solar heating cell as claimed in claim 9 wherein said liquid mixture comprises water.

11. A solar heating cell as claimed in claim 10 wherein said water includes an antifreeze.

12. A solar heating cell as claimed in claim 10 wherein said water includes an antimicrobial agent.

13. A solar heating cell as claimed in claim 10 wherein said water includes a surfactant.

14. A solar heating cell as claimed in claim 1 wherein said compression clips are of stainless steel.

15. A solar heating cell as claimed in claim 1 wherein said compression clips are of extruded aluminum.

16. A solar heating cell comprising:

a core, said core, being substantially in the form of a parallelepiped having two open sides opposite to one another, said core having an edge extending around each of said two open sides, said core further having an increased thickness adjacent to said edges defining shoulders inward of said edges on an outer surface thereof; said edges having outwardly and oppositely directed channels extending thereabout;

a first O-ring and a second O-ring, said first O-ring being disposed in said channel on one of said two sides of said core and said second O-ring being disposed in said channel on the other of said two sides of said core;

a first glass plate and a second glass plate, said first glass plate being on one of said two sides of said core in contact with said first O-ring and said second glass plate being on the other of said two sides of said core in contact with said second O-ring;

a plurality of elongated first compression clips of substantially U-shaped cross section, said first compression clips extending between said shoulders and said first glass plate to compress said first glass plate against said first O-ring, thereby making a watertight seal therebetween;

a spacer, said spacer having a first edge and a second edge, said spacer being disposed about a perimeter of said second glass plate, said first edge of said spaces being attached thereto with an adhesive;

a third glass plate, said third glass plate being of substantially the same dimensions as said second glass plate, said third glass plate being attached to said second edge of said spacer with an adhesive, thereby forming an insulating space between said second glass plate and said third glass plate; and a plurality of elongated second compression clips, said elongated second compression clips having a section of substantially U-shaped cross section and a section of substantially L-shaped cross section extending therefrom, said section of substantially U-shaped cross section extending between said shoulders and said second glass plate to compress said second glass plate against said second O-ring, thereby making a watertight seal therebetween and enclosing an interior volume of said solar heating cell, wherein said interior volume is adapted for being substantially filled with a heat absorbing material, and said section of substantially L-shaped cross section extending to said third glass plate and compressing said third glass plate toward said second glass plate, thereby making said insulating space airtight.

17. A solar heating cell as claimed in claim 16 wherein said core comprises first and second core halves, said first and second core halves being hot-plate welded to one another forming a seam therebetween.

18. A solar heating cell as claimed in claim 17 wherein said first and second core halves are molded from polypropylene.

19. A solar heating cell as claimed in claim 16 wherein said core has a top, said top having a raised portion, said raised portion containing a compartment, said compartment being separate from said interior volume of said solar heating cell and communicating therewith through a central gap.

20. A solar heating cell as claimed in claim 19 wherein top surfaces of said interior volume are pitched upward at an angle toward said central gap.

21. A solar heating cell as claimed in claim 20 wherein said angle is less than 5°.

22. A solar heating cell as claimed in claim 19 wherein said raised portion includes a hole, and further comprising a plug in said hole, whereby said solar heating cell may be filled with a liquid mixture or may have liquid mixture added at any time, and said hole may be subsequently closed.

23. A solar heating cell as claimed in claim 16 wherein said first and second O-rings are of EPDM (ethylene-propylene diene monomer) rubber.

24. A solar heating cell as claimed in claim 16 wherein said interior volume is filled with a liquid mixture.

25. A solar heating cell as claimed in claim 24 wherein said liquid mixture comprises water.

26. A solar heating cell as claimed in claim 25 wherein said water includes an antifreeze.

27. A solar heating cell as claimed in claim 25 wherein said water includes an antimicrobial agent.

28. A solar heating cell as claimed in claim 25 wherein said water includes a surfactant.

29. A solar heating cell as claimed in claim 16 wherein said first compression clips are of stainless steel.

30. A solar heating cell as claimed in claim 16 wherein said first compression clips are of extruded aluminum.

31. A solar heating cell as claimed in claim 16 wherein said second compression clips are of stainless steel.

32. A solar heating cell as claimed in claim 16 wherein said second compression clips are of an extruded plastic material.

33. A solar heating cell as claimed in claim 32 wherein said extruded plastic material is polyvinyl chloride (PVC).

34. A solar heating cell as claimed in claim 16 wherein said second compression clips are of a pultruded composite plastic.

35. A solar heating cell as claimed in claim 16 wherein said insulating space contains a translucent insulating material.

36. A solar heating cell as claimed in claim 35 wherein said translucent insulating material is aerogel.

37. A solar heating cell as claimed in claim 36 wherein said aerogel is hydrophobic.

38. A solar heating cell as claimed in claim 16 further comprising a heat-absorbing mask, said heat-absorbing mask being within said interior volume of said solar heating cell and being perforated to have an open area between 20% and 50% of the total area thereof, said heat-absorbing mask having a first side and a second side, said first side being of a light color and said second side being of a dark color, said heat-absorbing mask being disposed so that said first side faces said first glass plate and said second side faces said second glass plate.

39. A solar heating block as claimed in claim 38 wherein said light color of said first side of said heat-absorbing mask is white.

40. A solar heating block as claimed in claim 38 wherein said dark color of said second side of said heat-absorbing mask is black.

41. A solar heating block as claimed in claim 38 wherein said heat-absorbing mask is adjacent to said second glass plate.

42. A solar heating block as claimed in claim 38 wherein said heat-absorbing mask is adhered to said second glass plate.

43. A solar heating cell as claimed in claim 16 wherein said insulating space contains an insulating gas.

44. A solar heating cell as claimed in claim 43 wherein said insulating gas is nitrogen.

45. A solar heating cell as claimed in claim 43 wherein said insulating gas is argon.

46. A solar heating cell as claimed in claim 43 wherein said insulating gas is krypton.

47. A solar heating cell as claimed in claim 43 wherein said insulating gas is a mixture of argon and krypton.

48. A solar heating cell as claimed in claim 43 wherein said insulating gas is air.

49. A solar heating cell as claimed in claim 16 wherein said spacer has a slot between said first and second edges thereof, said slot being within said insulating space between said second glass plate and said third glass plate, and further comprising a fourth glass plate mounted within said slot and dividing said insulating space into a first and a second portion.

50. A solar heating cell as claimed in claim 49 wherein at least one of said first and second portions of said insulating space contains an insulating gas.

51. A solar heating cell as claimed in claim 50 wherein said insulating gas is nitrogen.

52. A solar heating cell as claimed in claim 50 wherein said insulating gas is argon.

53. A solar heating cell as claimed in claim 50 wherein said insulating gas is krypton.

54. A solar heating cell as claimed in claim 50 wherein said insulating gas is a mixture of argon and krypton.

55. A solar heating cell as claimed in claim 50 wherein said insulating gas is air.

* * * * *